US008859453B2

(12) United States Patent
Hong et al.

(10) Patent No.: US 8,859,453 B2
(45) Date of Patent: Oct. 14, 2014

(54) IMPLANTATION OF NI NANO DOMAINS IN REFRACTORY METAL OXIDE SUPPORT BY MEANS OF SOL-GEL ENCAPSULATION—AN EFFECTIVE SOLUTION TO COKE FORMATION IN THE PARTIAL OXIDATION OF NATURAL GAS

(71) Applicant: National University of Singapore, Singapore (SG)

(72) Inventors: Liang Hong, Singapore (SG); Xiong Yin, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 14/085,338

(22) Filed: Nov. 20, 2013

(65) Prior Publication Data

US 2014/0077134 A1     Mar. 20, 2014

Related U.S. Application Data

(62) Division of application No. 13/583,319, filed as application No. PCT/SG2011/000090 on Mar. 8, 2011, now Pat. No. 8,658,559.

(60) Provisional application No. 61/311,657, filed on Mar. 8, 2010.

(51) Int. Cl.
| | | |
|---|---|---|
| B01J 23/89 | (2006.01) | |
| B01J 37/16 | (2006.01) | |
| B01J 37/03 | (2006.01) | |
| B01J 23/755 | (2006.01) | |
| B01J 37/18 | (2006.01) | |
| B01J 37/00 | (2006.01) | |
| C01B 3/26 | (2006.01) | |
| C01B 3/40 | (2006.01) | |
| B01J 23/78 | (2006.01) | |
| B01J 23/02 | (2006.01) | |
| B01J 21/04 | (2006.01) | |
| B01J 21/06 | (2006.01) | |
| B01J 21/08 | (2006.01) | |

(52) U.S. Cl.
CPC ............ *C01B 3/26* (2013.01); *C01B 2203/0261* (2013.01); *B01J 23/892* (2013.01); *B01J 37/16* (2013.01); *B01J 23/02* (2013.01); *B01J 37/036* (2013.01); *B01J 23/755* (2013.01); *B01J 37/18* (2013.01); *C01B 2203/1247* (2013.01); *C01B 2203/1058* (2013.01); *B01J 37/0036* (2013.01); *B01J 21/04* (2013.01); *C01B 3/40* (2013.01); *B01J 23/78* (2013.01); *B01J 37/033* (2013.01); *B01J 21/06* (2013.01); *B01J 21/08* (2013.01); *C01B 2203/1241* (2013.01); *B01J 21/066* (2013.01)
USPC ........... 502/259; 502/328; 502/327; 502/337; 502/326; 502/335; 252/373

(58) Field of Classification Search
CPC ...... B01J 23/755; B01J 23/70; B01J 37/0201; C07C 2523/755; C07C 2521/08
USPC ................. 502/328, 327, 337, 326, 259, 335; 252/373
See application file for complete search history.

(56) References Cited

U.S. PATENT DOCUMENTS

| | | |
|---|---|---|
| 4,725,573 A | 2/1988 | Mesters et al. |
| 6,878,667 B2 | 4/2005 | Gaffney et al. |
| 6,911,161 B2 | 6/2005 | Xu et al. |
| 2002/0177628 A1 | 11/2002 | Gaffney et al. |

*Primary Examiner* — Colleen Dunn
*Assistant Examiner* — Haytham Soliman
(74) *Attorney, Agent, or Firm* — Cesari and McKenna, LLP

(57) ABSTRACT

A metal oxide-supported nickel catalyst includes a matrix containing a metal oxide and catalytic sites distributed throughout the matrix and having an intricate interface with the matrix, in which the catalytic sites are selected from the group consisting of nano-nickel(0) domains and nano-nickel(0)-A(0) alloy domains. Also disclosed are a method for preparing this catalyst and a method for using it to produce carbon monoxide and hydrogen by partial oxidation of a $C_1$-$C_5$ hydrocarbon.

20 Claims, No Drawings

IMPLANTATION OF NI NANO DOMAINS IN REFRACTORY METAL OXIDE SUPPORT BY MEANS OF SOL-GEL ENCAPSULATION—AN EFFECTIVE SOLUTION TO COKE FORMATION IN THE PARTIAL OXIDATION OF NATURAL GAS

CROSS-REFERENCE TO RELATED APPLICATIONS

This application is a divisional of U.S. application Ser. No. 13/583,319, filed on Oct. 10, 2012, which is the National Stage of International Application No. PCT/SG2011/000090, filed on Mar. 8, 2011, which claims priority of U.S. Provisional Application No. 61/311,657, filed on Mar. 8, 2010. The content of these applications are incorporated herein by reference in its entirety.

BACKGROUND OF THE INVENTION

Catalytic partial oxidation (or dry reforming) of methane (POM), other light alkane compounds existing in natural gas (e.g., $C_2$-$C_5$ alkanes), and alcohols producing synthesis gas ($CO+2H_2$) can be integrated as an anodic reaction ($CH_4 + O^{2-} \rightarrow CO + 2H_2 + 2e^-$) with the electrochemical separation of air ($1/2 O_2 + 2e^- \rightarrow O^{2-}$), a cathodic reaction, to form a catalytic membrane reactor. This combination has paramount commercial value in terms of saving energy and production of $H_2$, $N_2$, and a series of useful chemical intermediates. Currently, the obstacle to the industrial reforming of light hydrocarbon gases is still deactivation of metal oxide-supported Ni(0) catalyst due to deposition of carbon on Ni(0) catalytic sites.

This invention provides a solution to this dilemma through developing a new synthetic route for preparing a catalyst.

SUMMARY OF THE INVENTION

In one aspect, the invention features a metal oxide-supported nickel catalyst including a matrix containing a metal oxide and catalytic sites distributed throughout the matrix and having an intricate interface with the matrix, in which the Metal oxide can be $Al_2O_3$, $SiO_2$, $CaO$, $MgO$, $ZrO_2$, $CeO_2$, $TiO_2$, or $Y_2O_3$ (e.g, $Al_2O_3$, $SiO_2$, $CaO$, or $ZrO_2$); and the catalytic sites can be nano-nickel(0) domains or nano-nickel(0)-A(0) alloy domains, A being Rh, Pd, Pt, Ru, Cu, or Co (e.g, Rh), providing that when the catalytic sites are nano-nickel(0)-A(0) alloy domains, nickel(0) constitutes at least 95 wt % in the alloy domains. Based on the total weight of the catalyst, the weight percentage of the metal oxide-containing matrix is 70-85% and the weight percentage of the catalytic sites is 15-30% (e.g., 18-22 wt %).

Each of these catalytic sites has an intricate (i.e., complex interpenetrating) interface with the matrix. In other words, there is no clear-cut interfacial boundary between the catalytic site and the matrix. The particular interface results from amalgamation between the catalytic site and the matrix at their interfacial boundary.

In another aspect, this invention features a method of preparing a metal-oxide supported nickel catalyst. The method includes at least five steps: (i) producing in an aqueous medium $(Ni_xO_y)(OH)_{2(x-y)}$ particles and, optionally, another metal-containing particles selected from the group consisting of $(A_nO_m)(OH)_{3(n-2/3m)}$ particles and $(A_nO_m)(OH)_{2(n-m)}$ particles, thus forming a colloidal suspension, in which $1 \leq x \leq 100$, $y < x$, $1 \leq n \leq 100$, $m < n$, A is a metal selected from the group consisting of Rh, Pd, Pt, Ru, Cu, and Co, and the particles are stabilized by a surfactant; (ii) adding a compound of formula $M_p(OR)_q$ to the colloidal suspension to form a sol, in which p is 1; q can be 2, 3, or 4; M can be Al, Si, Ca, Mg, Zr, Ce, Ti, or Y; and R can be H or $C_gH_{2g+1}$, g being an integer between 1 and 4; (iii) heating the sol at an adequate temperature (e.g., 60-100° C.) to form a gel; (iv) calcining the gel at a temperature, just high enough (e.g., 580-620° C.) to burn out organic components to form a metal oxide-supported nickel oxide catalyst, which contains NiO and, optionally, $A_nO_m$; and (v) reducing the metal oxide-supported nickel oxide catalyst to form a metal oxide-supported nickel catalyst containing catalytic sites that are selected from the group consisting of nano-nickel(0) domains and nano-nickel(0)-A (0) alloy domains, respectively. The reducing step can be performed in hydrogen or methane.

The $(Ni_xO_y)(OH)_{2(x-y)}$ particles, $(A_nO_m)(OH)_{3(n-2/3m)}$ particles, and $(A_nO_m)(OH)_{2(n-m)}$ particles can be stabilized using any surfactant that leads to a stable oil-in-water emulsion. In particular, one can use a surfactant or a blend of surfactants that has a hydrophile-lipophile balance value of 8-16. For example, one can use n-hexadecyl trimethyl ammonium bromide.

The metal oxide-supported nickel catalyst prepared by the above-described method is also within the scope of this invention.

In still another aspect, this invention features a method of producing carbon monoxide and hydrogen by partial oxidation of a $C_1$-$C_5$ hydrocarbon. In this method, a gaseous stream containing a $C_1$-$C_5$ hydrocarbon and oxygen gas is fed into a reactor, in which the above-described metal-oxide supported nickel catalyst is placed to produce carbon monoxide and hydrogen at 700-900° C. The metal-oxide supported nickel catalyst used in this method, as mentioned above, contains catalytic sites that can be nano-nickel(0) domains or nano-nickel(0)-A(0) alloy domains and have a particular interface with the matrix. This interface can effectively prevent the Ni domains from merging at a typical catalytic dry reforming temperature (800-900° C.). As a result, the catalyst becomes highly immune to coking. For example, it can retain a high methane conversion ($X_{CH4}$>90%) and syngas selectivity ($S_{CO}$>85%) over a long run (e.g., 6 hours) of partial oxidation of methane.

The details of one or more embodiments of the invention are set forth in the description below. Other features, objects, and advantages of the invention will be apparent from the following drawings, detailed description of several embodiments, and also from the appending claims.

DETAILED DESCRIPTION

This invention is based in part on an unexpected discovery that a certain preparation method leads to a metal oxide-supported Ni catalyst that retains high methane conversion ($X_{CH4}$>90%) and syngas selectivity ($S_{CO}$>85%) over a long run of partial oxidation of methane.

Syngas is a significant industrial gas mixture having applications in hydrogen, methanol, acetic acid production, and Fischer-Tropsch (FT) synthesis to prepare synfuel. Syngas is commercially produced by steam reforming of natural gas ($CH4 + H_2O \rightarrow CO + 3H_2$) at high temperature (850° C.-1000° C.) under pressure (10-40 atm) in the presence of a group VIII metal (e.g, Rh, Ru, Pt, Ir, Pd, Ni) catalyst. However, it is a highly endothermic process. On the contrary, the catalytic partial oxidation of methane (POM) to syngas is a mild exothermic process ($-35.7$ kJ.mol$^{-1}$), it has therefore been extensively studied for many years ($CH_4 + 1/2 O_2 \rightarrow CO + 2H_2$). Compared with the conventional steam reforming process, the partial oxidation has the advantages of slight heat release, low pressure, and smaller reactors.

Supported nickel catalysts, particularly nickel supported on refractory materials (e.g., $Al_2O_3$, $SiO_2$, $ZrO_2$, $CeO_2$, $TiO_2$, MgO, CaO, $La_2O_3$, $Y_2O_3$, $HfO_2$, $Si_3N_4$, $Sm_2O_3$), have been developed for carrying out POM. To date, the catalytic partial oxidation of light hydrocarbon gases has not yet been operated in industrial scale due to a lack of qualified catalysts. An industrially competitive reforming catalyst must be economic, display a high feedstock conversion and a high selectivity to syngas, and assure stable performance over the designated operation period of time. The major advantages of a Ni catalyst system are a low cost and, in general, a high activity and selectivity. However, they suffer from poor stability, which is the result of the sintering of fine Ni metal particles and coke formation (carbon deposition) on Ni sites at reforming temperature (800-900° C.).

Extensive work has, therefore, been carried out to improve the stability of the nickel catalyst system. It has been comprehended that coke formation can be significantly alleviated by reducing Ni crystallites; however, the decrease in active nickel particle sizes weakens their resistance to sintering. Hence, to achieve a high performance-based catalytic stability, the desired catalyst structure must be able to inhibit both coke formation and sintering coincidently. In the last decade, efforts towards this goal produced three representative advancements as highlighted below.

Ruckenstein et al. ("Methane Partial Oxidation Over NiO/MgO Solid Solution Catalysts," *Appl. Catal. A* 183:85-92 (1999)) disclosed the NiO/MgO solid solution catalysts for partial oxidation of methane to synthesis gas at high space velocity. The NiO (35 mol %)/MgO catalyst showed good stability at 850° C. for 50 hours; however, the activity and stability of the. NiO/MgO catalyst are sensitive to the NiO concentration, i.e. a departure from this solid solution composition, will cause elapsing of the original advantage.

Takenaka et al. ("Specific Performance of Silica-coated Ni Catalysts for the Partial Oxidation of Methane to Synthesis Gas," *J. Catalysis* 245:392-400 (2007)) disclosed the water-in-oil micro-emulsion method for preparing nano-sized nickel metal particles (5 nm) covered by 10 nm silica layers. This catalyst fabrication process indeed brings about a greater improvement on the catalytic stability of the supported Ni catalyst than conventional impregnation method. However, by, this means, the active nickel concentration in the catalyst is low (<5 wt %). With such a low loading level of catalytic component, a high temperature (~850° C.) becomes necessary to achieve a high feedstock conversion and syngas selectivity. Nevertheless, at the high reforming temperatures, the Ni loading level should be high enough (>10 wt %) to tolerate the evaporation of nickel species in order to maintain a stable output of POM over a long run.

Incorporation of precious metals, such as Rh and Pt, into the supported Ni catalysts is an other effective measure to revamp the supported Ni reforming catalyst system [Choudhary et al. "Beneficial Effects of Noble Metal Addition to Ni/$Al_2O_3$ Catalyst for Oxidative Methane-to-Syngas Conversion," *J. Catalysis* 157 (1995) 752-754]. Yet, this approach obviously increases material cost.

In conclusion, as far as the supported Ni catalyst is concerned, it is still a considerably challenging task to maintain a high conversion rate of reactant gas and high selectivity for CO and $H_2$ for even a pilot run. None of the existing supported nickel catalysts has claimed such trait due to the aforementioned dilemmas.

This invention has explored a new chemical preparation approach that lays down a unique microstructure of the active Ni site in the commonly adopted refractory oxide support. As a result, the catalyst presents a steady high activity and selectivity in POM over a long reaction period of time (e.g., 300 hours). By this approach, $(Ni_xO_y)(OH)_{2(x-y)}$ sol particles and, optionally, another metal-containing sol particles selected from the group consisting of $(A_nO_m)(OH)_{3(n-2/3m)}$ particles and $(A_nO_m)(OH)_{2(n-m)}$ particles, A being Rh, Pd, Pt, Ru, Cu, or Co, are stabilized by a suitable surfactant upon their generation in an aqueous medium. Then, these sol particles are dispersed in a large excess of a sol dispersion of a metal hydroxide (R=H) or metal organoxide (R=$C_gH_{2g+1}$, g=1-4) [$M_p(OR)_q$], where the metal M represents a metal ion of a refractory support (e.g., $Al_2O_3$, $SiO_2$, CaO, MgO, $ZrO_2$, $CeO_2$, $TiO_2$, or $Y_2O_3$). The sol particles generated from $M_p(OR)_q$ are then subjected to gellation, whilst the surfactant-encapsulated $(Ni_xO_y)(OH)_{2(x-y)}$ sol particles (and, optionally, another metal-containing sol particles described above) are embedded in-situ in the $M_pO_q$ gel formed. After that, the resultant $(Ni_xO_y)(OH)_{2(x-y)}$ sol (and, optionally, another metal-containing sol particles)/$M_pO_q$ gel system is calcined in air to form a metal oxide supported nickel oxide catalyst, and consecutively reduced in $H_2$ to generate the desired supported Ni catalyst. The confinement role of the $M_pO_q$ gel prevents congregation of nickel crystallites and hence effectively inhibits deposition of coke as manifested by an electron micrographic study.

Of note, as shown in the example below, the metal oxide supported nickel oxide catalyst can also be reduced in $CH_4$ (NiO+n $CH_4 \rightarrow Ni(C_n)$+x $H_2$+y$H_2O$, x>>y) at a reaction temperature which normally falls in the range of 700-950 ° C. In this temperature range, methane will undergo combustion at the same time since its auto ignition temperature is about 600° C. The carbon dioxide and steam produced from the combustion ($CH_4+2O_2 \rightarrow CO_2+2H_2O$), will further clean up the carbon filaments formed on Ni through the reactions, $CO_2$+C$\rightarrow$2CO and $2H_2O$+C$\rightarrow CO_2+2H_2$.

In addition, it is important to note that the method of this invention and the conventional impregnation method result in two completely different chemical microenvironments even though Ni crystallites are seated on the same support (e.g., $ZrO_2$) with the same Ni loading level (e.g., 20 wt %), as evidenced by temperature-programmed reduction (TPR) experiments. TPR of the catalyst of this invention shows two equivalent reduction peaks at 700° C. and 880° C., while the catalyst obtained by the impregnation method shows a reduction peak at 420° C. with two shoulder peaks at 500° C. and 550° C. For TPR diagrams, the high-temperature peak results from reduction of NiO located at the interfacial area. The catalyst of this invention shows that a very high temperature (~880° C.) is required to drive the reduction of interfacial NiO species. In addition, compared with the bulk-reduction peak at 700° C., a comparable peak area for the reduction of interfacial species is displayed, meaning that a significant amount of these species are present in the sample.

In principle, the $H_2$-reduction temperature unveils information about chemical microenvironments where Ni crystallites are located. A higher reduction temperature is usually required in order to reduce NiO domains that are smaller in size and intermingle to a higher extent with the matrix of support. As a result, smaller and more dispersively embedded Ni crystallites are produced after reduction. The NiO-metal oxide catalyst of this invention provides a highly diffusive interface between each NiO domain and the matrix so that reduction of NiO domains requires much higher TPR temperatures than those NiO prepared by thermal decomposition of $Ni(NO_3)_2$ on $ZrO_2$.

Furthermore, the TPR-based explanation of microstructures can be verified by Transmission Electron Microscopy (TEM), which should show Ni(0) particles in contrast to $ZrO_2$ support on TEM image providing Ni(0) particles have a clear-cut boundary between them and the support. The TEM images demonstrate that, for a non-trivial (i.e., 20 wt %) Ni loading, Ni(0) particles cannot be distinguished from the matrix by TEM, an indication that Ni(0) particles are miniature and own a mutual penetrating interface with the matrix.

Without further elaboration, it is believed that the above description has adequately enabled the present invention. The following examples are, therefore, to be construed as merely illustrative, and not limitative of the remainder of the disclosure in any way whatsoever. All of the publications cited herein are hereby incorporated by reference in their entirety.

EXAMPLE 1

Preparation of $Al_2O_3$-Supported Ni Catalyst 15.0 g $Ni(NO_3)_2.6H_2O$ and 5.0 g n-hexadecyl trimethylammonium bromide (CTAB) were dissolved in 100 ml water at 65° C. with stirring, and then after the solution was cooled down to room temperature 10 ml tetramethylammonium hydroxide (TMAH, 1.0 M aqueous solution) was added into it with immediate blending. A stable $(Ni_xO_y)(OH)_{2(x-y)}$ colloidal suspension was formed after the above mixture was stirred for about 1 hour. This was followed by the introduction of 60 g aluminum isopropoxide into the resulting $(Ni_xO_y)(OH)_{2(x-y)}$ colloidal suspension at room temperature, and the suspension formed was ball-milled using ceramic media for 72 hours, which led to a homogeneous sol dispersion. This sol-dispersion was thickened at 80° C. to form a solid gel, and the solid gel was finally subjected to calcination at 600° C. for 4 hours to generate an $Al_2O_3$-supported Ni catalyst with 22 wt % nickel loading.

EXAMPLE 2

Preparation of $SiO_2$-Supported Ni Catalyst 15.0 g $Ni(NO_3)_2.6H_2O$ and 5.0 g CTAB were dissolved in 100 ml water at 65° C. with stirring, and after the solution was cooled down to room temperature 10 ml TMAH (1.0 M aqueous solution) was added into it with immediate blending. A stable $(Ni_xO_y)(OH)_{2(x-y)}$ colloidal suspension was fanned after the above mixture was stirred for about 1 hour. This was followed by the introduction of 60 ml tetraethyl orthosilicate (TEOS) into the resulting $(Ni_xO_y)(OH)_{2(x-y)}$ colloidal suspension at room temperature. The mixture was homogenized by stirring overnight at room temperature and then the stirring was continued at 65° C. for additional 24 h to allow complete hydrolysis of TEOS to form a sol suspension. This sol-dispersion was converted to a solid gel after being thickened at 80° C., and the solid gel was finally subjected to calcination at 600° C. for 4 hours to generate a $SiO_2$-supported Ni catalyst with 18 wt % nickel loading.

EXAMPLE 3

Preparation of CaO-Supported Ni Catalyst 15.0 g $Ni(NO_3)_2.H_2O$ and 5.0 g CTAB were dissolved in 100 ml water at 65° C. with stirring, and then after the solution was cooled down to room temperature 10 ml TMAH (1.0 M aqueous solution) was added into it with immediate blending. A stable $(Ni_xO_y)(OH)_{2(x-y)}$ colloidal suspension was formed after the above mixture was stirred for about 1 hour. This was followed by addition of 12 g CaO into the resulting $(Ni_xO_y)(OH)_{2(x-y)}$ colloidal suspension at room temperature, and the suspension was ball-milled using ceramic for 72 hours. In this process, the surface of CaO becomes a hydrogel layer comprising $Ca(OH)_2$ species in the basic medium. Therefore, $(Ni_xO_y)(OH)_{2(x-y)}$ sol particles can effectively enter in this hydrogel layer. The suspension was thickened at 80° C. to form a solid gel and the solid gel was finally subjected to calcination at 600° C. for 4 hours to generate a CaO-supported Ni catalyst with 22 wt % nickel loading.

EXAMPLE 4

Preparation of 20 wt % Ni—$ZrO_2$ Catalyst 15.0 g $Ni(NO_3)_2.6H_2O$ and 5.0 g CTAB were dissolved in 100 ml water at 65° C. with stirring, and then after the solution was cooled down to room temperature 10 ml TMAH (1.0 M aqueous solution) was added into it with immediate blending. A stable $(Ni_xO_y)(OH)_{2(x-y)}$ colloidal suspension was formed after the above mixture was stirred for about 1 hour. This was followed by the introduction of 47 g zirconium (IV) butoxide (80 wt % solution in 1-butanol) into the resulting $(Ni_xO_y)(OH)_{2(x-y)}$ colloidal suspension at room temperature, and the suspension generated was stirred overnight to complete hydrolysis, which led to a homogeneous sol dispersion. This sol-dispersion was thickened at 80° C. to form a solid gel, and the solid gel was finally subjected to calcination at 600° C. for 4 hours to generate a $ZrO_2$-supported Ni catalyst with 20 wt % nickel loading.

COMPARATIVE EXAMPLE

Preparation of 20 wt % Ni—$ZrO_2$ Catalyst by Impregnation Method

A fine $ZrO_2$ powder was made by hydrolysis of zirconium (IV) butoxide in water and followed by calcination at 600° C. for 4 hours. The $ZrO_2$ powder obtained had an average particle diameter of about 300 nm and a BET surface area of 10.2 $m^2/g$. Thereafter, 1.6 g $ZrO_2$ was introduced into an aqueous solution consisting of 1.98 g $Ni(NO_3)_2.6H_2O$ and 50 ml water. The resulting suspension was dried and calcined at 600° C. for 4 hours to form a $ZrO_2$-supported Ni catalyst with 20 wt % nickel loading.

EXAMPLE 5

Assessment of the Supported Ni Catalysts in POM

The catalysts obtained from the above preparation procedures were evaluated for partial oxidation of methane at 850° C. For example, for the $Al_2O_3$—Ni catalyst, the reactant stream comprised four components: $He/N_2/CH_4/O_2$ (with a molar ratio of 37.3/3.8/2/1), and gas hourly space velocity (GHSV) was 245,195 $h^{-1}$. After time-on-stream of 6 hours, methane conversion was higher than 95%, CO selectivity was higher than 98%, and the $H_2/CO$ molar ratio was 2/1.

TABLE 1

A comparison of the POM performance of different catalysts

| Catalyst | time-on-stream | GHSV ($h^{-1}$) | $X_{CH4}$ (mol %) | $S_{CO}$ (mol %) | $H_2/CO$ |
|---|---|---|---|---|---|
| $Al_2O_3$—Ni* | 6 | 245,195 | 95 | 98 | 2 |
| $SiO_2$—Ni* | 3 | 68,120 | 98 | 97 | 2 |
| CaO—Ni* | 7 | 90,640 | 98.6 | 94 | 2 |
| $ZrO_2$—Ni** | 20 | 125,200 | 98.9 | 99.9 | 2 |

$He/N_2/CH_4/O_2$:
*molar ratio of 37.3/3.8/2/1;
**molar ratio of 56/3.8/3/1.

EXAMPLE 6

Testing the Catalytic Stability of the $ZrO_2$—Ni Catalyst in POM

After being used to catalyze POM (as listed in Table 1), the $ZrO_2$—Ni catalyst was reused in a new round, in which the molar ratio of reactant gas mixture $He/N_2/CH_4/O_2$ was 37.3/3.8/2/1 and the GHSV was 125,200 $h^{-1}$. The catalyst displayed steadily very high activity ($X_{CH4}$>95%) and selectivity of POM ($S_{CO}$>95%) over 300 hours.

EXAMPLE 7

Preparation of $ZrO_2$ Supported Ni(Rh) Catalyst 15.0 g $Ni(NO_3)_2.6H_2O$, 0.40 g $RhCl_3.xH_2O$ and 5.1 g CTAB are dissolved in 100 ml water at 65° C. with stirring, and then after the solution is cooled down to room temperature 10.5 ml TMAH (1.0 M aqueous solution) is added into it with immediate blending. A stable colloidal suspension comprising $(Ni_xO_y)(OH)_{2(x-y)}$ and $(Rh_nO_m)(OH)_{3(n-2/3m)}$ sol particles is formed after the above mixture is stirred for about 1 hour. This is followed by the introduction of 47 g zirconium (IV) butoxide (80 wt % solution in 1-butanol) into the resulting colloidal suspension at room temperature, and the suspension generated is stirred overnight to complete hydrolysis, which leads to a homogeneous sol dispersion. This sol-dispersion is thickened at 80° C. to form a solid gel, and the solid gel is finally subjected to calcination at 600° C. for 4 hours to generate a $ZrO_2$-supported Ni (97.08 mol %)-Rh (2.92 mol %) catalyst with 20 wt. % Ni—Rh alloy loading.

EXAMPLE 8

Preparation of $ZrO_2$ Supported Ni(Pd) Catalyst 15.0 g $Ni(NO_3)_2.6H_2O$, 3 mL $Pd(NO_3)_2$ solution (10 wt %, d=1.118 g/mL) and 5.1 g CTAB are dissolved in 100 ml water at 65° C. with stirring, and then after the solution is cooled down to room temperature 10.5 ml TMAH (1.0 M aqueous solution) is added into it with immediate blending. A stable colloidal suspension comprising $(Ni_xO_y)(OH)_{2(x-y)}$ and $(Pd_nO_m)(OH)_{2(n-m)}$ sol particles is formed after the above mixture was stirred for about 1 hour. This is followed by the introduction of 47 g zirconium (IV) butoxide (80 wt % solution in 1-butanol) into the resulting colloidal suspension at room temperature, and the suspension generated is stirred overnight to complete hydrolysis, which leads to a homogeneous sol dispersion. This sol-dispersion is thickened at 80° C. to form a solid gel, and the solid gel is finally subjected to calcination at 600° C. for 4 hours to generate a $ZrO_2$-supported Ni (97.26 mol %)-Pd (2.74 mol %) catalyst with 20 wt. % Ni—Pd alloy loading.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A metal oxide-supported nickel catalyst comprising a matrix, 70-85 wt %, containing a metal oxide, and catalytic sites, 15-30 wt %, distributed throughout the matrix and having an intricate interface with the matrix, wherein the metal oxide is selected from the group consisting of $Al_2O_3$, $SiO_2$, CaO, MgO, $ZrO_2$, $CeO_2$, $TiO_2$, and $Y_2O_3$; and the catalytic sites are selected from the group consisting of nano-nickel(0) domains and nano-nickel(0)-A(0) alloy domains, A being Rh, Pd, Pt, Ru, Cu, or Co, providing that when the catalytic sites are nano-nickel(0)-A(0) alloy domains, nickel(0) constitutes at least 95 wt % in the alloy domains.

2. The catalyst of claim 1, wherein the catalytic sites are nano-nickel(0) domains.

3. The catalyst of claim 2, wherein the metal oxide is $Al_2O_3$, $SiO_2$, CaO, or $ZrO_2$.

4. The catalyst of claim 3, wherein the catalytic sites constitute 18-22 wt % of the catalyst.

5. The catalyst of claim 1, wherein the catalytic sites are nano-nickel(0)-A(0) alloy domains.

6. The catalyst of claim 5, wherein A is Rh.

7. The catalyst of claim 5, wherein the metal oxide is $Al_2O_3$, $SiO_2$, CaO, or $ZrO_2$.

8. The catalyst of claim 7, wherein the catalytic sites constitute 18-22 wt % of the catalyst.

9. The catalyst of claim 8, wherein A is Rh.

10. A metal oxide-supported nickel catalyst prepared by a method comprising:
producing in an aqueous medium $(Ni_xO_y)(OH)_{2(x-y)}$ particles and, optionally, another metal-containing particles selected from the group consisting of $(A_nO_m)(OH)_{3(n-2/3m)}$ and $(A_nO_m)(OH)_{2(n-m)}$ particles, thus forming a colloidal suspension, wherein 1≤x ≤100, Y<x, 1≤n≤100, m<n, A is a metal selected from the group consisting of Rh, Pd, Pt, Ru, Cu, and Co, and the particles are stabilized by a surfactant;
adding a compound of formula $M_p(OR)_q$ to the colloidal suspension to form a sol, wherein p is 1; q is 2, 3, or 4; M is a metal selected from the group consisting of Al, Si, Ca, Mg, Zr, Ce, Ti, and Y; and R is H or $C_gH_{2g+1}$, g being an integer between 1 and 4;
heating the sol to form a gel;
calcining the gel to form a metal oxide-supported nickel oxide catalyst; and
reducing the metal oxide-supported nickel oxide catalyst to form a metal oxide-supported nickel catalyst;
wherein the metal oxide-supported nickel catalyst contains a matrix, 70-85 wt %, including a metal oxide; and catalytic sites, 15-30 wt %, distributed throughout the matrix and having an intricate interface with the matrix, in which the metal oxide is selected from the group consisting of $Al_2O_3$, $SiO_2$, CaO, MgO, $ZrO_2$, $CeO_2$, $TiO_2$, and $Y_2O_3$; and the catalytic sites are selected from the group consisting of nano-nickel(0) domains and nano-nickel(0)-A(0) alloy domains, A being Rh, Pel, Pt, Ru, Cu, or Co, providing that when the catalytic sites are nano-nickel(0)-A(0) alloy domains, nickel(0) is at least 95 wt % in the alloy domains.

11. The catalyst of claim 10, wherein in the producing step only $(Ni_xO_y)(OH)_{2(x-y)}$ particles are produced so as to form a metal oxide-supported nano-nickel(0) domains catalyst.

12. The catalyst of claim 11, wherein the metal oxide is $Al_2O_3$, $SiO_2$, CaO, or $ZrO_2$.

13. The catalyst of claim 12, wherein the catalytic sites constitute 18-22 wt % of the catalyst.

14. The catalyst of claim 10, wherein in the producing step both $(Ni_xO_y)(OH)_{2(x-y)}$ particles and another metal-containing particles are produced so as to form a metal oxide-supported nano-nickel(0)-A(0) alloy domains catalyst is formed.

15. The catalyst of claim 14, wherein A is Rh.

16. The catalyst of claim 14, wherein the metal oxide is $Al_2O_3$, $SiO_2$, CaO, or $ZrO_2$.

17. The catalyst of claim 16, wherein the catalytic sites constitute 18-22 wt % of the catalyst.

18. The catalyst of claim 17, wherein A is Rh.

19. A method for producing carbon monoxide and hydrogen by partial oxidation of a $C_1$-$C_5$ hydrocarbon, the method comprising placing in a reactor a metal oxide-supported nickel catalyst of claim 1, and feeding into the reactor a gaseous stream containing a $C_1$-$C_5$ hydrocarbon and oxygen gas to allow the $C_1$-$C_5$ hydrocarbon to react with oxygen gas at 700-900° C. to produce carbon monoxide and hydrogen.

20. A method for producing carbon monoxide and hydrogen by partial oxidation of a $C1$-$C_S$ hydrocarbon, the method comprising placing in a reactor a metal oxide-supported nickel catalyst of claim 10, and feeding into the reactor a gaseous stream containing a $C_1$-$C_5$ hydrocarbon and oxygen gas to allow the $C_1$-$C_5$ hydrocarbon to react with oxygen gas at 700-900° C. to produce carbon monoxide and hydrogen.

* * * * *